United States Patent [19]

Lundgard et al.

[11] Patent Number: 4,904,426
[45] Date of Patent: Feb. 27, 1990

[54] PROCESS FOR THE PRODUCTION OF FIBERS FROM POLY(ETHERETHERKETONE)-TYPE POLYMERS

[75] Inventors: Richard A. Lundgard, Antioch; Henry N. Beck, Walnut Creek, both of Calif.

[73] Assignee: The Dow Chemical Company, Midland, Mich.

[21] Appl. No.: 175,716

[22] Filed: Mar. 31, 1988

[51] Int. Cl.$^4$ .............................................. D01D 5/247
[52] U.S. Cl. .................... 264/41; 210/500.23; 210/500.27; 210/500.28; 264/203; 264/209.1; 264/211.15; 264/211.16
[58] Field of Search ............... 528/491, 480, 125, 126, 528/128; 264/41, 184, 203, 209.1, 211.14, 211.16, 211.19; 210/500.23, 500.28, 500.21, 500.27

[56] References Cited

U.S. PATENT DOCUMENTS

| | | | |
|---|---|---|---|
| 4,118,363 | 10/1978 | Smith | 524/371 |
| 4,320,224 | 3/1982 | Rose et al. | 528/126 |
| 4,331,798 | 5/1982 | Stanilard | 528/126 |
| 4,419,486 | 12/1983 | Rose | 525/534 |
| 4,456,740 | 6/1984 | Holubka et al. | 525/528 |
| 4,540,684 | 9/1985 | Stoltefuss et al. | 514/32 |
| 4,711,945 | 12/1987 | Daniels | 528/219 |
| 4,714,725 | 12/1987 | Hendy et al. | 524/108 |
| 4,721,732 | 1/1988 | Dubrow et al. | 210/500.34 |

FOREIGN PATENT DOCUMENTS

| | | |
|---|---|---|
| 0008894 | 6/1980 | European Pat. Off. . |
| 0008895 | 6/1980 | European Pat. Off. . |
| 3402471 | 8/1985 | Fed. Rep. of Germany . |
| 62-095104 | 5/1987 | Japan . |
| 2180790 | 4/1987 | United Kingdom . |

OTHER PUBLICATIONS

Hawley, Gessner G., "*The Condensed Chemical Dictionary*", 10th Ed., Van Nostrand Reinhold Co., N.Y., pp. 305 & 700.

ICI Advanced Materials, "*Victrex Peek*, A Guide to Grades for Injection Molding".

Bishop et al., "Solubility and Properties of a Poly(Aryl Ether Ketone) in Strong Acids", Macromolecules 1985, ACS, vol. 18, pp. 86–93.

Jin et al, "A Sulphonated Poly(Aryl Ether Ketone)", Dept. of Polymer Science and Engineering, Univ. of Massachusetts, Amherst, MA, 7 pages.

H. W. Hill., "Polymers Containing Sulfur", *Enc. of Chem. Tech.* vol. 18, pp. 793–814, John Wiley and Sons, N.Y. (1982).

J. Davis, "Composites, High Performance," *Enc. of Chem Tech* Supplemental vol., pp. 260–281, John Wiley and Sons, N.Y. (1984).

Dr. Klaus Dahl (Raychem Corporation), "Heat Resistant Semicrystalline Poly(phenylene ether ketones): Melt Processable High Performance Polymers," Industrial Affiliates Symposium on High Performance Polymers, Department of Chemistry and Chemical Eng., Stanford Univ., Dec. 3–5, 1986.

*Primary Examiner*—Hubert C. Lorin

[57] ABSTRACT

A process for preparing microporous poly(etheretherketone)-type fibers comprising forming an extrusion mixture of at least one unsulphonated poly(etheretherketone)-type polymer and a solvent comprising at least one organic compound consisting predominantly of carbon and hydrogen, wherein the organic compound has a molecular weight of between about 160 and 450, contains at least one six membered aromatic ring structure, possesses a boiling point of between about 240 and 480 degrees Celsius, and is capable of dissolving at least about 10 weight percent of the poly(etheretherketone)-type polymer present at the extrusion temperature, extruding to form solid or hollow fibers, conveying the fibers through at least one quench zone, conveying the fibers through at least one leach zone, and drying the fibers, wherein the fibers so formed possess interconnecting or non-interconnecting pores.

24 Claims, 1 Drawing Sheet

FIG._1.

PROCESS FOR THE PRODUCTION OF FIBERS FROM POLY(ETHERETHERKETONE)-TYPE POLYMERS

BACKGROUND OF THE INVENTION

This invention relates to a process for preparing microporous fibers from poly(etheretherketone)-type polymers. In a preferred embodiment, this invention relates to a process for preparing microporous poly(etheretherketone)-type hollow fiber membranes. Such hollow fiber membranes are useful in the treatment of liquids by the membrane separation processes of ultrafiltration, microfiltration, pervaporation, membrane distillation, and reverse osmosis. The hollow fiber membranes of this invention are also useful as microporous supports for hollow fiber composite liquid or gas separation membranes.

Poly(etheretherketone)-type polymers are high performance thermoplastics which possess high glass transition temperatures, high crystalline melting points, high thermal stability, and high solvent resistance. These properties make poly(etheretherketone)-type polymers useful for a number of applications, including the fabrication of high strength fiber reinforced composite materials. Poly(etheretherketone)-type polymers are also desirable polymers for membranes used in liquid separations, particularly membrane separation processes which involve treatment of strong organic, acidic, or basic solvents at elevated temperatures.

The very properties which make poly(etheretherketone)-type polymers desirable materials for use in applications which require high strength or solvent resistance also make the polymers very difficult to process. One typical method of preparing fibers involves dissolving the polymer material in a solvent or a mixture of solvent and non-solvent, extruding the blend into hollow fibers, and immersing the extruded fibers in a coagulation bath. However, poly(etheretherketone)-type polymers are extremely solvent resistant and are poorly soluble in all common solvents Therefore, for example, to form membranes, poly(etheretherketone) is typically dissolved in very strong organic acids such as concentrated sulfuric acid to sulfonate the poly(etheretherketone), which makes the polymer soluble in common solvents such as dimethylformamide and dimethylacetamide. The problem with this process is that the solvent resistance of sulfonated poly(etheretherketone) is less than that of the unsulfonated polymer. Furthermore, sulfonated poly(etheretherketone) swells in aqueous solutions, which adversely affects membrane performance in aqueous separation applications.

What is needed is a process of preparing microporous poly(etheretherketone)-type fibers using solvents or mixtures of solvents and non-solvents which do not chemically modify or degrade the polymer during extrusion so that the high strength and solvent resistance of the polymer is retained by the fabricated fibers.

SUMMARY OF THE INVENTION

This invention is a process for preparing microporous poly(etheretherketone)-type fibers, comprising:

A. forming an extrusion mixture of
  (1.) at least one poly(etheretherketone)-type polymer,
  (2.) a solvent comprising at least one organic compound consisting predominantly of carbon and hydrogen and optionally oxygen, nitrogen, sulfur, halogen, and mixtures thereof, wherein the organic compound has a molecular weight of between about 160 and 450, contains at least one six membered aromatic ring structure, possesses a boiling point of between about 240 and 480 degrees Celsius, and is capable of dissolving at least about 10 weight percent of the poly(etheretherketone)-type polymer present at the extrusion temperature, and
  (3.) optionally a non-solvent comprising at least one organic compound consisting predominantly of carbon and hydrogen and optionally oxygen, phosphorus, silicon, nitrogen, sulfur, halogen, and mixtures thereof, wherein the organic compound has a molecular weight of between about 120 and 455, possesses a boiling point of between about 240 and 480 degrees Celsius, and dissolves less than about 10 weight percent of the poly(etheretherketone)-type polymer present at the extrusion temperature;
B. extruding the fluid to form solid or hollow fibers;
C. conveying the fibers through at least one quench zone wherein the fibers cool and solidify;
D. conveying the fibers through at least one leach zone wherein a substantial portion of the remaining solvent and optional non-solvent are removed; and
E. drying the fibers; wherein the fibers so formed possess interconnecting or non-interconnecting pores.

The fibers formed by the inventive process have excellent solvent and temperature resistance. The fibers also possess high mechanical strength. The fibers are useful in the formation of fiber reinforced composite materials. The fibers containing interconnecting pores are useful as microporous membranes for liquid separations and as microporous supports for composite liquid or gas separation membranes.

DETAILED DESCRIPTION OF THE INVENTION

Poly(etheretherketone)-type polymers refers to polymers containing predominantly ether, —R—O—R—, and ketone, —R—CO—R—, linkages, wherein R is a divalent aromatic group. R is preferably a substituted or unsubstituted phenylene of Formula 1:

Formula 1 wherein

X is independently in each occurrenc hydrogen, a $C_{1-4}$ alkyl, or a halogen; and m is an integer between 0 and 4 inclusive.

X is preferably hydrogen, methyl, ethyl, chlorine, bromine, or fluorine.

Examples of poly(etheretherketone)-type polymers within the scope of this invention include poly(etherketone) (PEK), poly(aryletherketone) (PAEK), poly(etheretherketone) (PEEK), poly(etherketoneketone) (PEKK), poly(etheretheretherketone) (PEEEK), poly(etheretherketoneketone) (PEEKK), poly(etherketone-etherketoneketone) (PEKEKK), and mixtures thereof. An especially preferred poly(etherether- ketone)-type polymer for use in this invention is PEEK, that is poly(oxy-p-phenyleneoxy-p-phenylenecarbonyl-p-phenylene). PEEK is comprised of the repeat units described in Formula 2.

Formula 2

Another especially preferred poly(etheretherketone)-type polymer for use in this invention is PEK, that is, poly(oxy-1,4-phenylenecarbonyl-1,4-phenylene). PEK is comprised of the repeat units described in Formula 3.

Formula 3

Commercially available PEEK, for example, Victrex TM PEEK 450 (TM Trademark of ICI Americas), has a glass transition temperature of about 143 degrees Celsius and a melting point of about 334 Celsius. Such commercially available PEEK possesses a tensile strength of about 13,300 psi. (ASTM Test Method D638), an elongation at break of about 50 percent (ASTM Test Method D638 at about 23 degrees Celsius and test speed of 0.2 in./min.), an ultimate shear strength of about 13,800 psi. (ASTM Test Method D3846), a shear modulus of 188,500 psi. (at about 23 degrees Celsius), and a tensile modulus (1 percent secant) of about 522,100 psi. (ASTM Test Method D638 at about 23 degrees Celsius). The synthesis of such polymers is known in the art. See U.S. Pat. Nos. 4,320,224 and 4,331,798, the relevant portions incorporated herein by reference.

The solvents useful in this invention are organic compounds consisting predominantly of carbon and hydrogen and optionally oxygen, nitrogen, sulfur, halogen, and mixtures thereof, wherein the organic compound has a molecular weight of between about 160 and 450, contains at least one six membered aromatic ring structure, possesses a boiling point of between about 240 and 480 degrees Celsius, and is capable of dissolving at least about 10 weight percent of the poly(etheretherketone)-type polymer present at the extrusion temperature. The solvent more preferably dissolves at the extrusion temperature at least about 25 weight percent of the poly(etheretherketone)-type polymer, even more preferably about 50 weight percent of the poly(etheretherketone)-type polymer.

Preferable solvents useful in this invention include diphenic acid, N,N-diphenylformamide, benzil, anthracene, 1-phenylnaphthalene, 4-bromobiphenyl, 4-bromodiphenyl ether, benzophenone, 1-benzyl-2-pyrrolidinone, o,o'-biphenol, phenanthrene, triphenylmethanol, triphenylmethane, triphenylene, 1,2,3-triphenylbenzene, diphenylsulfone, 2,5-diphenyloxazole, 2-biphenylcarboxylic acid, 4-biphenylcarboxylic acid, m-terphenyl, 4-benzoylbiphenyl, 2-benzoylnaphthalene, 3-phenoxybenzyl alcohol, fluoranthene, 2,5-diphenyl-1,3,4-oxadiazole, 9-fluorenone, 1,2-dibenzoyl benzene, dibenzoylmethane, p-terphenyl, 4-phenylphenol, 4,4'-dibromobiphenyl, diphenyl, phthalate, 2,6-diphenylphenol, phenothiazine, 4,4'-dimethoxybenzophenone, 9,10-diphenylanthracene, pentachlorophenol, pyrene, 9,9'-bifluorene, a mixture of terphenyls, for example, Santowax R TM mixed terphenyls (TM trademark of the Monsanto Company), a mixture of partially hydrogenated terphenyls, for example, Therminol 66 TM partially hydrogenated terphenyls (TM trademark of the Monsanto Company), a mixture of terphenyls and quaterphenyls, for example, Therminol 75 TM mixed terphenyls and quaterphenyls (TM trademark of the Monsanto Company), 1-phenyl-2-pyrrolidinone, 4,4'-isopropyldenediphenol, 4,4'-dihydroxybenzophenone, quaterphenyl, and mixtures thereof. Not all of these solvents are equally effective with all poly(etheretherketone)-type polymers. One of ordinary skill in the art can readily select the best solvent for a specific polymer empirically.

More preferred solvents include N,N-diphenylformamide, benzil, anthracene, 1-phenylnaphthalene, 4-bromobiphenyl, 4-bromodiphenyl ether, benzophenone, 1-benzyl-2-pyrrolidinone, o,o'-biphenol, phenanthrene, triphenylmethanol, triphenylmethane, triphenylene, 1,2,3-triphenylbenzene, diphenylsulfone, 2,5-diphenyloxazole, 2-biphenylcarboxylic acid, 4-biphenylcarboxylic acid, m-terphenyl, 4-benzoylbiphenyl, 2-benzoylnaphthalene, 3-phenoxybenzyl alcohol, fluoranthene, 2,5-diphenyl-1,3,4-oxadiazole, 9-fluorenone, 1,2 dibenzoyl benzene, dibenzoylmethane, p-terphenyl, 4-phenylphenol, 4,4'-dibromobiphenyl, diphenyl phthalate, 2,6-diphenylphenol, phenothiazine, 4,4'-dimethoxybenzophenone, 9,10-diphenylanthracene, pentachlorophenol, pyrene, 9,9'bifluorene, a mixture of terphenyls, for example, Santowax R TM mixed terphenyls (TM trademark of the Monsanto Company), a mixture of partially hydrogenated terphenyls, for example, Therminol 66 TM partially hydrogenated terphenyls (TM trademark of the Monsanto Company), a mixture of terphenyls and quaterphenyls, for example, Therminol 75 TM mixed terphenyls and quaterphenyls (TM trademark of the Monsanto Company), 1-phenyl-2-pyrrolidinone, 4,4'-isopropyldenediphenol, 4,4'-dihydroxybenzophenone, quaterphenyl, and mixtures thereof.

Even more preferred solvents include triphenylmethanol, triphenylmethane, triphenylene, 1,2,3-triphenylbenzene, diphenylsulfone, 2,5-diphenyloxazole, 2-biphenylcarboxylic acid, 4-biphenylcarboxylic acid, m-terphenyl, 4-benzoylbiphenyl, 2-benzoylnaphthalene, 3-phenoxybenzyl alcohol, fluoranthene, 2,5-diphenyl-1,3,4-oxadiazole, 9-fluorenone, 1,2-dibenzoyl benzene, dibenzoylmethane, p-terphenyl, 4-phenylphenol, 4,4'-dibromobiphenyl, diphenyl phthalate, 2,6-diphenylphenol, phenothiazine, 4,4'-dimethoxybenzophenone, 9,10-diphenylanthracene, pentachlorophenol, pyrene, 9,9'-bifluorene, a mixture of terpnenyls, for example, Santowax R TM mixed terphenyls (TM trademark of the Monsanto Company), a mixture of partially hydrogenated terphenyls, for example, Therminol 66 TM partially hydrogenated terphenyls (TM trademark of the Monsanto Company), a mixture of terphenyls and quaterphenyls, for example, Therminol 126 mixed terphenyls and quaterphenyls (TM trademark of the Monsanto Company), 1-phenyl-2-pyrrolidinone, 4,4'-isopropylidenediphenol, 4,4'-dihdroxybenzophenone, and mixtures thereof.

Especially preferred solvents include m-terphenyl, p-terphenyl, a mixture of terphenyls, for example, Santowax R TM mixed terphenyls (TM trademark of the Monsanto Company), a mixture of partially hydrogenated terphenyls, for example, Therminol 66 TM partially hydrogenated terphenyls (TM trademark of the Monsanto Company), a mixture of terphenyls and quaterphenyls, for example, Therminol 75 TM mixed terphenyls and quaterphenyls (TM trademark of the Monsanto Company), diphenylsulfone, and mixtures thereof.

The optional non-solvents useful in this invention are organic compounds consisting predominantly of carbon and hydrogen and optionally oxygen, phosphorus, silicon, nitrogen, sulfur, halogen, and mixtures thereof, wherein the organic compound has a molecular weight of between about 120 and 455, possesses a boiling point of between about 240 and 480 degrees Celsius, and dissolves less than about 10 weight percent of the poly(etheretherketone)-type polymer present at the extrusion temperature. The non-solvents more preferably have a boiling point of between about 300 and about 480 degrees Celsius, even more preferably between about 350 and about 480 degrees Celsius, most preferably between about 400 and 480 degrees Celsius. The non-solvents preferably are soluble in the solvent used at elevated temperatures.

Preferable non-solvents useful in this invention include 1,3,5-triphenylbenzene, tetraphenylmethane, tetraphenylsilane, diphenylsulfoxide, 1,1-diphenylacetone, 1,3-diphenylacetone, 4-acetylbiphenyl, 4,4'-diphenylbenzophenone, 1-benzoyl-4-piperidone, diphenyl carbonate, bibenzyl, diphenylmethylphosphate, 1-bromonapthalene, 2-phenoxybiphenyl, triphenylphosphate, cyclohexylphenylketone, 1,4-dibenzoylbutane, 2,4,6-trichlorophenol, mineral oil, paraffin oil, petroleum oil, for example, Mobiltherm 600 TM heat transfer oil, Mobiltherm 603 TM heat transfer oil, Mobiltherm 605 TM heat transfer oil (TM all trademarks of Mobil Oil Corporation), butyl stearate, 9-phenyl-anthracene, 2-phenylphenol, 1-ethoxynaphthalene, phenyl benzoate, 1-phenyldecane, 1-methoxynaphthalene, 2-methoxy-naphthalene, 1,3-diphenoxybenzene, 1,8-dichloroanthra-quinone, 9,10-dichloroanthracene, polyphosphoric acid, 1-chloronaphthalene, diphenyl ether, 1-cyclohexyl-2-pyrrolidinone, hydrogenated terphenyl, for example, HB-40 TM hydrogenated terphenyl (TM trademark of the Monsanto Company), dioctyl phthalate, 5-chloro-2-benzoxazolone, dibenzothiophene, diphenyl sulfide, diphenyl chlorophosphate, fluorene, sulfolane, methyl myristate, methyl stearate, hexadecane, dimethyl phthalate, tetraethylene glycol dimethyl ether, diethylene glycol dibutyl ether, docosane, eicosane, dotriacontane, 2,7-dimethoxynaphthalene, 2,6-dimethoxynaphthalene, o-terphenyl, 1,1-diphenylethylene, epsilon-caprolactam, thianthrene, silicone oil, for example, DC-704 TM silicone oil and DC-710 TM silicone oil (TM trademarks of Dow-Corning Corporation), and mixtures thereof.

More preferred non-solvents include 1,3,5-triphenylbenzene, tetraphenylmethane, tetraphenylsilane, diphenylsulfoxide, 1,1-diphenylacetone, 1,3-diphenylacetone, diphenyl carbonate, diphenylmethylphosphate, 2-phenoxybiphenyl, butyl stearate, 9-phenylanthracene, 1-cyclohexyl-2-pyrrolidinone, mineral oil, paraffin oil, petroleum oil, for example, Mobiltherm 600 TM heat transfer oil, Mobiltherm 603 TM heat transfer oil, Mobiltherm 605 TM heat transfer oil (TM all trademarks of Mobil Oil Corporation), HB-40 TM hydrogenated terphenyl (TM trademark of the Monsanto Company), dioctyl phthalate, dibenzothiophene, diphenyl chlorophosphate, methyl myristate, methyl stearate, docosane, eicosane, dotriacontane, o-terphenyl, thianthrene, silicone oil, for example, DC-704 TM silicone oil and DC-710 TM silicone oil (TM trademarks of Dow-Corning Corporation), and mixtures thereof.

Even more preferred non-solvents include 1,3,5-triphenylbenzene, tetraphenylmethane, tetraphenylsilane, diphenylsulfoxide, 2-phenoxybiphenyl, butyl stearate, 9-phenylanthracene, dioctyl phthalate, methyl stearate, docosane, dotriacontane, thianthrene, mineral oil, paraffin oil, petroleum oil, for example, Mobiltherm 600 TM heat transfer oil, Mobiltherm 603 TM heat transfer oil, Mobiltherm 605 TM heat transfer oil (TM all trademarks of Mobil Oil Corporation), and mixtures thereof.

Most preferred non-solvents include 1,3,5-triphenylbenzene, tetraphenylmethane, tetraphenylsilane, 9-phenylanthracene, dotriacontane, and mixtures thereof.

The selection of the components for the extrusion blend is dependent upon whether a non-interconnecting or interconnecting porous structure is desired. For use in fiber reinforced composites, the fibers may possess either a non-interconnecting or an interconnecting porous structure. For use as liquid separation membranes or as supports for liquid or gas separation membranes, the fibers preferably possess an interconnecting porous structure. In a non-interconnecting porous structure, the pores within the membrane are not completely interconnected so that the pores do not directly connect one side of the membrane with the other side of the membrane, although fluid flow through the membrane may still be accomplished by solution-diffusion transport of the fluid through the dense polymer regions of the membrane. In an interconnecting porous structure, the pores are completely interconnected so that the pores directly connect one side of the membrane with the other side of the membrane so that fluid flow through the membrane may be accomplished primarily by transport through the membrane's pores.

The factors which determine the formation of interconnecting versus non-interconnecting pores include the polymer concentration in the extrusion blend, volatility of the solvent, cooling rate of the nascent fiber, and composition of non-solvent in the extrusion blend. The formation of fibers with non-interconnecting pores preferably uses aextrusion blend containing polymer and solvent. The formation of fibers with interconnecting pores preferably uses an extrusion blend containing polymer, solvent and non-solvent.

The concentrations of the components in the extrusion mixture may vary and are dependent upon the desired type of pore structure (interconnecting versus non-interconnecting pores), porosity, and pore size of the fibers. The concentration of poly(etheretherketone)-type polymer in the extrusion mixture is that which results in a mixture with a suitable viscosity for extrusion at the extrusion temperature. The viscosity of the mixture must not be so high that the fluid is too viscous to extrude; the viscosity must not be too low such that the fluid cannot maintain its desired shape upon exiting the extrusion die. Extrusion blends of poly(etherether- ketone)-type polymers generally possess non-Newtonian viscosity behavoir: therefore, such blends exhibit a shear rate dependence upon viscosity. The mixture preferably has a viscosity at extrusion temperatures of between about 100 and 10,000 poise at a shear rate of from about 10 to 10,000 sec$^{-1}$, more preferably between about 300 and 1,000 poise at a shear rate of from about 50 to 1,000 sec$^{-1}$. In the case of non-interconnecting porous structures, the concentration of poly(etheretherketone)-type polymer is preferably from about 10 to about 90 weight percent, more preferably from about 20 to about 80 weight percent. In the case of an interconnecting porous structure, the concentration of poly(etheretherketone)-type polymer is preferably from about 20 to about 70 weight percent, more preferably from about 30 to about 65 weight percent. The concentration of the solvent is preferably from about 1 to about 90 weight percent, more preferably from about 2 to about 80 weight percent. The concentration of the optional non-solvent is preferably from about 0 to about 90 percent, more preferably from about 0 to about 80 weight percent. When a non-solvent is used, the solvent/non-solvent ratio is preferably from about 0.05 to 24, more preferably from about 0.1 to 12.

The fibers are extruded from the poly(etheretherketone)-type polymer compositions hereinbefore described. The components of the extrusion mixture may be combined prior to extrusion by mixing in any convenient manner with conventional mixing equipment, as for example, in a Hobart mixer. The extrusion blend may also be combined and mixed under heating in a resin kettle. Alternatively, the extrusion composition may be homogenized by extruding the mixture through a twin screw extruder, cooling the extrudate and grinding or pelletizing the extrudate to a particle size readily fed to a single or twin screw extruder. Alternatively, the components of the extrusion composition may be combined directly in a melt-pot or twin screw extruder and extruded into fibers in a single step. The use of static mixers helps to ensure blend homogeneity.

The mixture is heated to a temperature which results in a homogeneous fluid possessing a viscosity suitable for extrusion. hhe temperature should not be so high or the exposure time so long as to cause significant degradation of the poly(etheretherketone)-type polymer, solvents, and optional non-solvents. The temperature should not be so low as to render the fluid too viscous to extrude. The extrusion temperature is preferably between about 170 and about 400 degrees Celsius, more preferably between about 275 and about 350 degrees Celsius.

The mixture of polymer, solvent, and optional non-solvent is extruded through a solid fiber or hollow fiber die (spinneret). Solid fibers refer to fibers which are non-hollow. Such solid fiber dies or hollow fiber spinnerets typically are multi-holed and thus produce a tow of multiple fibers. The hollow fiber spinnerets include a means for supplying fluid to the core of the extrudate. The core fluid is used to prevent the collapsing of the hollow fibers as they exit the spinneret. The core fluid may be a gas such as nitrogen, air, carbon dioxide, or other inert gas or a liquid which is a non-solvent for the poly(etheretherketone)-type polymer such as dioctyl phthalate, methyl stearate, polyglycol, mineral oil, paraffin oil, petroleum oil, for example, Mobiltherm TM 600, 603, and 605 heat transfer oils (TM trademarks of Mobil Oil Corporation), and silicone oil, for example, DC-704 TM and DC-710 TM silicone oil (TM trademarks of Dow-Corning Corporation). Use of a liquid non-solvent as the core fluid may result in a microporous membrane with an inside skin. A solvent and non-solvent core fluid mixture may be used to control the inside skin morphology.

The extrudate exiting the die enters one or more quench zones. The environment of the quench zone may be gaseous or liquid. Within the quench zone, the extrudate is subjected to cooling to cause solidification of the fibers with the optional simultaneous removal of a portion of the solvent and optional non-solvent. In a preferred embodiment, the fibers are initially quenched in a gaseous environment such as air, nitrogen, or other inert gas. The temperature of the gaseous quench zone is preferably in the range from about 0 to about 100 degrees Celsius, more preferably in the range from about 10 to about 40 degrees Celsius. The residence time in the gaseous quench zone is preferably less than about 120 seconds, more preferably less than about 30 seconds. Shrouds may be used to help control gaseous flowrates and temperature profile in the gaseous quench zone.

Following or instead of the gaseous quench, the fibers may optionally be quenched in a liquid environment which is substantially a non-solvent for the poly(etheretherketone)-type polymer such as water or ethylene glycol and which optionally contains an effective amount of a swelling agent. The maximum temperature of the given liquid is that temperature at which the fiber is not adversely affected. The temperature is preferably between about 0 and about 200 degrees Celsius, more preferably between about 0 and about 100 degrees Celsius. The residence time in the liquid quench zone is preferably less than about 120 seconds, more preferably less than about 30 seconds.

Following quenching, the fibers may be passed through one or more leach baths to remove at least a portion of the solvent and/or optional non-solvent. The leach bath need not remove all of the solvent and/or non-solvent from the fibers. Preferably, the leach bath removes the solvent and/or non-solvent to a level of less than about 2.0 weight percent in the leached fiber. The leach bath is comprised of a solution which is a non-solvent for the poly(etheretherketone)-type polymer but which is a solvent for the extrusion solvent and/or non-solvent. Preferred leach liquids include toluene, xylene, acetone, chlorinated hydrocarbons such as methylene chloride, carbon tetrachloride, trichloroethylene, and 1,1,1-trichloroethane. The maximum temperature of the leach bath is that temperature at which the fibers are not adversely affected. The minimum temperature is that temperature at which solvent and/or non-solvent removal from the fibers occurs at a reasonable rate. The temperature of the leach bath is preferably between about 0 and about 200 degrees Celsius, more preferably between about 0 and about 80 degrees Celsius. The residence time in the leach bath is preferably less than about 14 hours, more preferably less than about 1 hour.

The fibers may be drawn down using conventional godet equipment to the appropriate size. Drawing may occur before, during, or after leaching. Line speeds are not critical and may vary significantly. Typical line speeds range from about 30 feet per minute to about 300 feet per minute. ln the case of hollow fibers used in membrane applications, the fibers preferably possess an outside diameter of from about 50 to about 3,000 microns, more preferably of from about 80 to about 2,000 microns with a wall thickness of preferably from about 10 to about 400 microns, more preferably from about 20 to about 400 microns. In the case of fibers used in fiber reinforced composites, the fibers preferably possess an outer diameter of from about 5 to 100 microns, more preferably from about 5 to about 50 microns; optionally the fibers may be hollow with a wall thickness preferably of from about 2 to about 45 microns, more preferably from about 2 to about 20 microns.

Following leaching, the fibers are dried. Prior to drying, the leach liquid remaining in the fibers may optionally be exchanged with a more volatile, non-polar drying agent which possesses a low surface tension and is a solvent for the leach liquid but a non-solvent for the polymer, in order to reduce the possibility of pore collapse during drying. Preferred drying agents include Freon 113 TM chlorofluorocarbon (TM trademark of E.1. duPont de Nemours). The exchange may be carried out at temperatures which do not adversely affect the membrane, preferably from between about 0 and about 45 degrees Celsius. The fibers may be dried in air or an inert gas such as nitrogen. Drying may also be done under reduced pressures. The fibers may be dried at temperatures at which drying takes place at a reasonable rate and which do not adversely affect the membrane. The drying temperature is preferably between about 0 and about 140 degrees Celsius, more preferably between about 10 and 80 degrees Celsius. The drying time is preferably less than about 24 hours, more preferably less than about 6 hours.

The microporous fibers of this invention may be characterized by their porosity and pore size. Porosity refers to the volumetric void volume of the fibers. Porosity is defined as $100 \times [1-(d_f/d_{peek})]$ where $d_f$ is the density of the final leached fiber and $d_{peek}$ is the density of the poly(etheretherketone)-type polymer. The fibers of this invention which possess non-interconnecting pores preferably have a porosity of between about 10 and about 90 percent, more preferably between about 20 and about 80 percent. Fibers of this invention which possess interconnecting pores preferably have a porosity of between about 20 and about 70 percent, more preferably between about 30 and about 65 percent. Pore size may be estimated by several techniques, including by scanning electron microscopy and/or measurements of bubble point, solvent flux, and molecular weight cutoff. Such techniques are well known in the art for characterizing the pore size of microporous membranes, see Robert Kesting, *Synthetic Polymeric Membranes*, 2nd edition, John Wiley & Sons, New York, 1985, pp. 46–56; Channing R. Robertson (Stanford University), *Molecular and Macromolecular Sieving by Asymmetric Ultrafiltration Membranes*, OWRT Report, NTIS No. PB85-1577661EAR, September 1984:and ASTM Test Method F316-86, the relevant portions incorporated herein by reference. The pore size is preferably between about $1 \times 10^{-3}$ microns to about 3.0 microns, more preferably between about $3 \times 10^{-3}$ microns to about 1.0 microns.

In a preferred embodiment of this invention, the process produces microporous hollow fiber membranes having interconnecting pores. Such membranes are useful in the treatment of liquids by the membrane separation processes of microfiltration, ultrafiltration, reverse osmosis, pervaporation, and membrane distillation. Such hollow fibers may also be used as porous supports for composite gas or liquid separation membranes. In an especially preferred embodiment, the process produces microporous hollow fiber membranes useful for ultrafiltration or microfiltration. Ultrafiltration and microfiltration are pressure driven filtration processes using microporous membranes in which particles or solutes are separated from solutions. Separation is achieved on the basis of differences in particle size or molecular weight. Membranes of this invention useful in ultrafiltration and microfiltration preferably possess a molecular weight cut off for ultrafiltration of about 10 to 500 Angstroms and a molecular weight cut off for microfiltration of about 0.05 to 7.0 microns. Microfiltration and ultrafiltration may be carried out at temperatures which do not adversely affect the membranes. Operating temperatures preferably range from about 0 to about 130 degrees Celsius. Operating pressures are dependent upon the pore size of the membrane and the particles or solutes being separated from solution. Preferred operating pressures range from about 5 to about 150 psi.

SPECIFIC EMBODIMENTS

Example 1

Solvents and Non-solvents for Polyetheretherketone (PEEK)

Poly(etheretherketone), designated as Grade 150P, is obtained from ICI Americas, Inc., Wilmington, Del. The PEEK is dried at 150 degrees Celsius for 16 hours in an air-circulating oven and is stored in a desiccator over Drierite. One hundred seven organic compounds are evaluated for their solvent effect on PEEK. Most of the organic compounds may be obtained from Aldrich Chemical Company and used as received. Other organic chemicals may be obtained from suppliers as listed in *Chemical Sources*, published annually by Directories Publishing Co., Inc., of Columbia, S.C.

Mixtures of PEEK and solvent, a total weight of less than about 2 grams, are prepared by weighing PEEK and solvent to a precision of $\pm 0.001$ gram in a 1 to 4 dram size glass vial. The resulting air space in each vial, which varies considerably due to the large differences in the bulk densities of the compounds, is purged with nitrogen. The vials are sealed with screw caps containing aluminum foil liners. Solubility is usually determined at about 10 weight percent polymer, followed by additional determinations at about 25 and 50 weight percent if necessary.

In the following tables, in the solubility column, "g" is greater than (>), and "s" is smaller or less than (<), and = is equal to.

Table 1 below lists the solvent effect of 107 organic compounds on PEEK. The approximate solubility of each polymer-organic compound mixture is shown at the indicated temperature(s). Compounds are assigned a number (beginning with 200) for easy reference. Also listed in Table 1 is an approximate molecular weight, melting point, and boiling point of each organic compound, if these physical properties are available.

Figure 1:
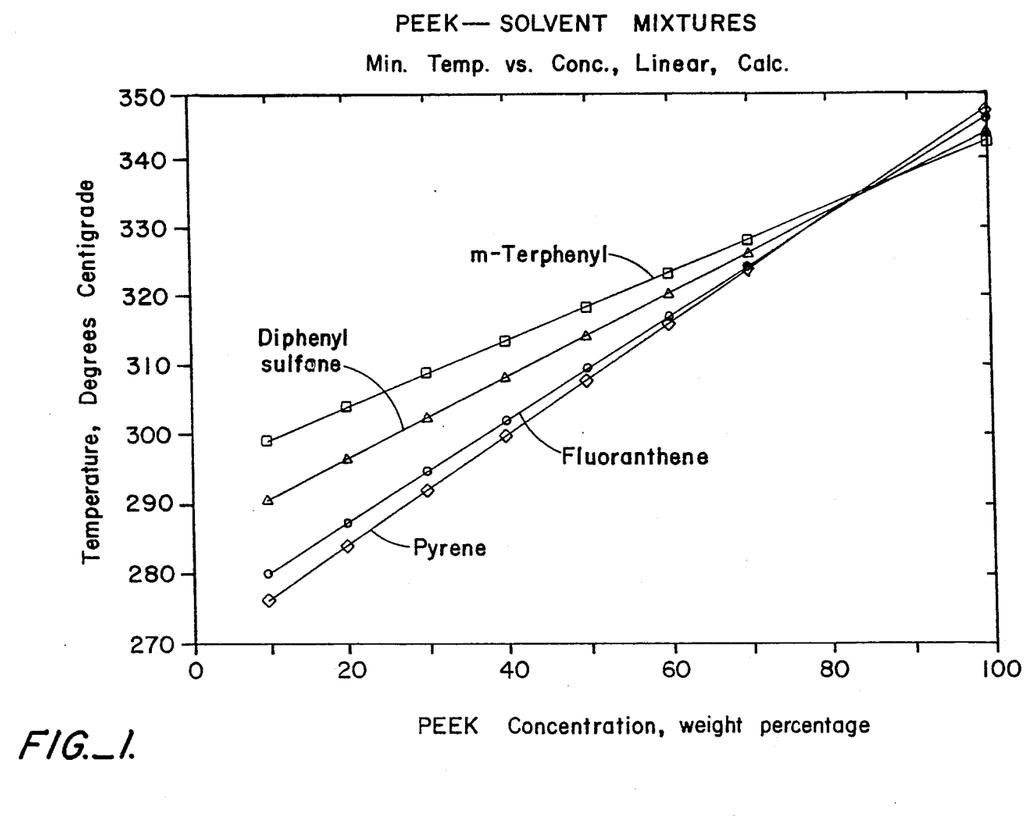
FIG. 1 illustrates a composite of temperature at ambient pressure at which a specific weight percent of PEEK will dissolve in the solvents m-terphenyl, pyrene, fluoranthene, and diphenyl sulfone.

FIG. 1 shows a composite of temperature at ambient pressure at which a specific weight percent of PEEK will dissolve in the solvents m-terphenyl, pyrene, fluoranthene and diphenyl sulfone. Any combination of temperature and polymer concentration above each line represents homogenous, soluble, one phase mixtures. Similarly any combination below each line represents insoluble multiphase mixtures.

|  |  |  | Approximate |  |  |
| --- | --- | --- | --- | --- | --- |
| Ref. No. | Compound | Molec. Weight | Melting Point | Boiling Point | Solub. (g = >; s = <) | Temp. (°C.) |
| 200 | Triphenylmethanol | 260 | 161 | 360 | g 50.1%? | 349 |
| 201 | Triphenylmethane | 244 | 93 | 359 | g 50.2% | 349 |
| 202 | Triphenylene | 228 | 196 | 438 | g 50.0% | 350 |
| 203 | 1,2,3-Triphenylbenzene | 306 | 158 | — | g 50.1% | 349 |
| 204 | 1,3,5-Triphenylbenzene | 306 | 173 | 460 | s 9.9% | 349 |
| 205 | Tetraphenylmethane | 320 | 281 | 431 | =s 10.7% | 349 |
| 206 | Tetraphenylsilane | 337 | 236 | 422 | s 10.1% | 349 |
| 207 | Diphenylsulfoxide | 202 | 70 | 350 | s 10.5% a | 349 |
| 208 | Diphenylsulfone | 218 | 124 | 379 | g 50.0% | 349 |
| 209 | 2,5-Diphenyloxazole | 221 | 72 | 360 | g 50.0% | 349 |
| 210 | Diphenic acid | 242 | 228 | — | g 25.1%? a | 349 |
| 211 | 1,1-Diphenylacetone | 210 | 60 | — | s 10.0% | 302 |
| 212 | 1,3-Diphenylacetone | 210 | 33 | 330 | s 10.1% | 302 |
| 213 | 4-Acetylbiphenyl | 196 | 117 | — | s 10.3% | 302 |
| 214 | 2-Biphenylcarboxylic acid | 198 | 109 | 349 | g 50.1% | 349 |
| 215 | 4-Biphenylcarboxylic acid | 198 | 225 | — | g 10.0% | 349 |
| 215 | 4-Biphenylcarboxylic acid | 198 | 225 | — | =g 50.1%? | 349 |
| 216 | m-Terphenyl | 230 | 83 | 379 | g 50.2% | 349 |
| 216 | m-Terphenyl | 230 | 83 | 379 | s 5.0% | 302 |
| 217 | 4-Benzoylbiphenyl | 258 | 100 | 419 | g 50.1% | 349 |
| 217 | 4-Benzoylbiphenyl | 258 | 100 | 419 | s 5.2% | 302 |
| 218 | 4,4'-Diphenylbenzophenone | 334 | — | — | s 10.4% | 302 |
| 219 | 1-Benzoyl-4-piperidone | 203 | 56 | 399 | g 9.8%? a | 349 |
| 220 | 2-Benzoylnaphthalene | 232 | 81 | 383 | g 49.9% | 349 |
| 221 | Diphenyl carbonate | 214 | 79 | 301 | s 10.1% | 302 |
| 222 | Bibenzyl | 182 | 51 | 284 | s 10.3% | 274 |
| 223 | Diphenyl methyl phosphate | 264 | — | 389 | s 10.0% a | 349 |
| 224 | 1-Bromonaphthalene | 207 | −1 | 280 | s 9.8% | 274 |
| 225 | N,N—Diphenylformamide | 197 | 71 | 337 | g 9.9% | 302 |
| 225 | N,N—Diphenylformamide | 197 | 71 | 337 | s 25.2% | 302 |
| 226 | 3-Phenoxybenzyl alcohol | 200 | — | 329 | g 24.7% | 302 |
| 226 | 3-Phenoxybenzyl alcohol | 200 | — | 329 | s 49.4% | 302 |
| 227 | Fluoranthene | 202 | 108 | 384 | g 50.0% | 349 |
| 228 | 2-Phenoxybiphenyl | 246 | 49 | 342 | s 10.9% | 302 |
| 229 | Triphenyl phosphate | 326 | 51 | 281 | s 9.9% | 274 |
| 230 | Cyclohexyl phenyl ketone | 188 | 56 | — | s 9.9% | 302 |
| 231 | 2,5-Diphenyl-1,3,4-oxadiazole | 222 | 139 | 382 | g 49.9% | 349 |
| 232 | 1,4-Dibenzoylbutane | 266 | 107 | — | s 10.0% | 302 |
| 233 | 9-Fluorenone | 180 | 83 | 342 | g 24.9% | 302 |
| 233 | 9-Fluorenone | 180 | 83 | 342 | s 50.0% | 302 |
| 234 | 1,2-Dibenzoyl benzene | 286 | 146 | — | g 50.2% | 349 |
| 235 | Dibenzoylmethane | 224 | 78 | 360 | g 50.4% | 349 |
| 236 | 2,4,6-Trichlorophenol | 197 | 65 | 246 | s 9.0% | 240 |
| 237 | Benzil | 210 | 94 | 347 | g 10.2% | 302 |
| 237 | Benzil | 210 | 94 | 347 | s 25.0% | 302 |
| 238 | p-Terphenyl | 230 | 212 | 389 | s 9.8% | 302 |
| 238 | p-Terphenyl | 230 | 212 | 389 | g 50.0% | 349 |
| 239 | Anthracene | 178 | 216 | 340 | g 10.0% | 302 |
| 239 | Anthracene | 178 | 216 | 340 | s 24.7% | 302 |
| 240 | Mineral oil | — | — | 360 | s 10.7% | 349 |
| 241 | Butyl stearate | 341 | — | 343 | s 10.0% | 302 |
| 242 | 9-Phenylanthracene | 254 | 151 | 417 | g 10.4%? a | 349 |
| 243 | 1-Phenylnaphthalene | 204 | — | 324 | g 9.9% | 302 |
| 243 | 1-Phenylnaphthalene | 204 | — | 324 | s 25.0% | 302 |
| 244 | 4-Phenylphenol | 170 | 166 | 321 | g 25.8% | 297 |
| 244 | 4-Phenylphenol | 170 | 166 | 321 | s 50.0% | 302 |
| 244 | 4-Phenylphenol | 170 | 166 | 321 | g 50.0% | 304 |
| 245 | 2-Phenylphenol | 170 | 59 | 282 | s 10.2% | 274 |
| 246 | 1-Ethoxynaphthalene | 172 | — | 280 | s 10.2% | 274 |
| 247 | Phenyl benzoate | 198 | 69 | 298 | s 9.8% | 274 |
| 248 | 1-Phenyldecane | 218 | — | 293 | s 10.2% | 274 |
| 249 | 1-Methoxynaphthalene | 158 | — | 269 | s 10.0% | 240 |
| 250 | 2-Methoxynaphthalene | 158 | 74 | 274 | s 9.4% | 240 |
| 252 | 4-Bromobiphenyl | 233 | 86 | 310 | g 5.2% | 300 |
| 252 | 4-Bromobiphenyl | 233 | 86 | 310 | s 24.8% | 302 |
| 252 | 4-Bromobiphenyl | 233 | 86 | 310 | s 5.2% | 241 |
| 253 | 4-Bromodiphenyl ether | 249 | 18 | 305 | =g 5.4% | 300 |
| 253 | 4-Bromodiphenyl ether | 249 | 18 | 305 | s 24.8% | 302 |
| 253 | 4-Bromodiphenyl ether | 249 | 18 | 305 | s 5.4% | 241 |
| 254 | 1,3-Diphenoxybenzene | 262 | 60 | — | =s 5.4% a | 300 |
| 254 | 1,3-Diphenoxybenzene | 262 | 60 | — | s 5.4% a | 241 |
| 255 | 1,8-Dichloroanthraquinone | 277 | 202 | — | s 5.3% a | 300 |
| 255 | 1,8-Dichloroanthraquinone | 277 | 202 | — | s 5.3% a | 241 |
| 256 | 9,10-Dichloroanthracene | 247 | 214 | — | s 5.5a% | 300 |
| 257 | 4,4'-Dibromobiphenyl | 312 | 170 | 355 | s 5.2% | 241 |
| 257 | 4,4'-Dibromobiphenyl | 312 | 170 | 355 | g 5.2% | 300 |
| 257 | 4,4'-Dibromobiphenyl | 312 | 170 | 355 | s 25.1% | 302 |
| 257 | 4,4'-Dibromobiphenyl | 312 | 170 | 355 | g 50.1% | 349 |

-continued

| Ref. No. | Compound | Molec. Weight | Melting Point | Boiling Point | Approximate Solub. (g = >; s = <) | Temp. (°C.) |
|---|---|---|---|---|---|---|
| 258 | Benzophenone | 182 | 50 | 305 | s 11.3% | 241 |
| 258 | Benzophenone | 182 | 50 | 305 | =g 11.3% | 300 |
| 258 | Benzophenone | 182 | 50 | 305 | s 24.9% | 302 |
| 259 | Polyphosphoric acid | — | — | — | s 4.8%a | 300 |
| 260 | 1 Chloronaphthalene | 162 | 20 | 258 | s 9.9% | 241 |
| 261 | Diphenyl ether | 170 | 27 | 259 | s 10.1% | 241 |
| 262 | 1-Cyclohexyl-2 pyrrolidinone | 167 | — | 302 | =s 10.0% a | 300 |
| 263 | 1-Benzyl-2-pyrrolidinone | 175 | — | — | g 14.9% | 302 |
| 263 | 1-Benzyl-2-pyrrolidinone | 175 | — | — | s 32.9% | 302 |
| 264 | o,o'-Biphenol | 186 | 109 | 315 | s 5.1% | 221 |
| 264 | o,o'-Biphenol | 186 | 109 | 315 | s 9.8% | 302 |
| 264 | o,o'Biphenol | 186 | 109 | 315 | s 25.0% | 302 |
| 265 | HB-40 (hydrogenated terphenyl)* | 244 | — | 325 | s 9.9% | 302 |
| 266 | Dioctyl phthalate | 391 | 50 | 384 | s 10.8% | 349 |
| 267 | 5-Chloro-2-benzoxazolone | 170 | 191 | — | s 10.2% a | 349 |
| 268 | Dibenzothiophene | 184 | 98 | 332 | g 10.3%? b? | 302 |
| 269 | Bis(4-chlorophenyl sulfone) | 287 | 146 | 412 | s 15.3% | 349 |
| 270 | Diphenylphthalate | 318 | 79.5 | — | g 50.0% | 349 |
| 271 | 2,6 Diphenylphenol | 246 | 101 | — | g 50.0% | 349 |
| 272 | Diphenyl sulfide | 186 | −40 | 296 | s 9.0% | 274 |
| 273 | Diphenyl chlorophosphate | 269 | — | 360 | s 9.9% | 349 |
| 274 | Fluorene | 166 | 113 | 298 | s 10.1% | 274 |
| 275 | Phenanthrene | 178 | 100 | 340 | g 10.0% | 302 |
| 275 | Phenanthrene | 178 | 100 | 340 | s 25.0% | 302 |
| 276 | Sulfolane | 120 | 27 | 285 | s 10.1% | 274 |
| 277 | Methyl myristate | 242 | 18 | 323 | s 8.2% | 302 |
| 278 | Methyl stearate | 299 | 38 | 358 | s 10.1% | 349 |
| 279 | Phenothiazine | 199 | 182 | 371 | g 49.9% | 349 |
| 380 | Hexadecane | 226 | 19 | 288 | s 10.0% | 274 |
| 281 | Dimethyl phthalate | 194 | 2 | 282 | s 10.0% | 274 |
| 282 | Tetraethylene glycol dimethylether | 222 | −30 | 275 | s 9.6% | 240 |
| 283 | Diethylene glycol dibutyl ether | 218 | −60 | 256 | s 9.6% | 240 |
| 284 | Docosane | 311 | 44 | 369 | s 10.4% | 349 |
| 285 | Eicosane | 283 | 37 | 340 | s 7.9% | 302 |
| 286 | Dotriacontane | 451 | 70 | 476 | s 10.4% | 349 |
| 287 | 2,7-Dimethoxynaphthalene | 188 | 138 | — | g 10.0% ab | 349 |
| 288 | 2,6-Dimethoxynaphthalene | 188 | 153 | — | g 10.8% b | 349 |
| 289 | o-Terphenyl | 230 | 58 | 337 | s 9.9% | 302 |
| 290 | 4,4'-Dimethoxy-benzophenone | 242 | 142 | — | g 50.0% | 349 |
| 291 | 9,10-Diphenylanthracene | 330 | 246 | — | g 50.0% | 349 |
| 292 | 1,1-Diphenylethylene | 180 | 6 | 270 | s 9.7% | 240 |
| 293 | epsilon-Caprolactam | 113 | 71 | 271 | s 10.0% | 240 |
| 294 | Tetraphenylethylene | 332 | 223 | 420 | s 10.9% | 302 |
| 295 | Pentafluorophenol | 184 | 35 | 143 | s 9.9% | 140 |
| 295 | Pentafluorophenol | 184 | 35 | 143 | g 5.0% | 141 |
| 296 | Thianthrene | 216 | 158 | 365 | s 10.2% | 302 |
| 298 | Pentachlorophenol | 266 | 189 | 310 | g 25.0% | 302 |
| 298 | Pentachlorophenol | 266 | 189 | 310 | s 50.6% | 302 |
| 299 | Pyrene | 202 | 150 | 404 | g 50.0% | 347 |
| 300 | Benzanthrone | 230 | 169 | — | s 25.5% ab | 328 |
| 301 | 9,9'-Bifluorene | 330 | 247 | — | g 25.2% | 327 |
| 301 | 9,9'-Bifluorene | 330 | 247 | — | g 50.2% | 318 |
| 301 | 9,9'-Bifluorene | 330 | 247 | — | g 50.2% | 327 |
| 302 | Santowax R* Chem Abstr. #2614-60-3 | — | 145 | 364 | g 60.0 | 347 |
| 303 | Therminol 66* Chem Abstr. #61788-32-7 | 240 | — | 340 | g 50.1% | 337 |
| 304 | Therminol 75* Chem Abstr. #26140-60-3 Chem Abstr. #217-59-4 | — | 70 | 385 | g 24.9% | 325 |
| 304 | Therminol 75* | — | 70 | 385 | g 50.3% | 332 |
| 305 | 1-Phenyl 2 pyrrolidinone | 161 | 68 | 345 | g 10.1% | 279 |
| 305 | 1 Phenyl 2 pyrrolidinone | 161 | 68 | 345 | g 25.5% | 290 |
| 305 | 1 Phenyl 2 pyrrolidinone | 161 | 68 | 345 | g 50.0% | 317 |
| 306 | 4,4'-Isopropyl-denediphenol | 228 | 156 | 402 | =g 50.0% | 301 |
| 306 | 4,4'-Isopropyl-denediphenol | 228 | 156 | 402 | g 50.0% | 318 |
| 307 | 4,4'-Didihydroxy-benzo phenone | 214 | 214 | — | s 10.0% | 301 |
| 307 | 4,4'-Dihydroxy-benzo-phenone | 214 | 214 | — | g 25.0% | 310 |
| 307 | 4,4'-Dihydroxy-benzo- | 214 | 214 | — | s 50.0% | 319 |

| Ref. No. | Compound | Molec. Weight | Melting Point | Boiling Point | Approximate Solub. (g = >; s = <) | Temp. (°C.) |
|---|---|---|---|---|---|---|
| | phenone | | | | | | a = Black or very dark color
b = reacts?
*Monsanto Company

Example 2

Non-interconnecting Porous PEEK Solid Fibers

A mixture of 41 weight percent PEEK (ICI grade 380) and 59 weight percent m-terphenyl is heated to about 340 degrees Celsius in a resin kettle with stirring under nitrogen purge to form a uniform solution. The blend is poured into a metal tray, cooled, broken into pieces, and ground into particles.

The PEEK/m-terphenyl particles are fed to a ¾ inch Killion extruder and solid (non-hollow) fibers extruded under a temperature profile from about 150 to about 345 degrees Celsius. The fibers are initially quenched in room temperature air for about 1 second, followed by quenching in an ice water bath for about 5 seconds. The m-terphenyl is extracted from the fibers by soaking the fibers in toluene at room temperature for about two days. The fibers are then air dried at room temperature for about two days. The resulting fiber size is about 485 microns.

The weight loss of the extracted fibers is determined by calculating 100× (preextraction weight-postextraction weight)/preextraction weight to be 55.3 percent.

Examination of the extracted fibers by scanning electron microscopy (SEM) indicates that the fibers possess a porous structure with a thin skin of about 20 microns at the outer surface.

Example 3

Non-interconnecting Porous PEEK Hollow Fibers

A mixture of about 50 weight percent PEEK (ICI grade 450) and 50 weight percent Santowax R TM mixed terphenyls (TM trademark of Monsanto Company) is heated to about 350 degrees Celsius in a resin kettle with stirring under nitrogen purge to form a uniform solution. The blend is poured into a metal tray, cooled, broken into pieces, and ground into particles. The PEEK/m-terphenyl particles are then extruded through a KOCH Engineering high intensity static mixer and pelletized.

The PEEK/m-terphenyl pellets are fed to a ¾ inch Killion single screw extruder equipped with a hollow fiber spinneret and core gas. The hollow fibers are extruded at about 340 degrees Celsius, quenched in room temperature air for less than 0.5 seconds, followed by quenching for about 1.5 seconds in a water bath at room temperature. The fibers are drawn at a rate of 40 meters/minute and wound onto spools. The Santowax R TM mixed terphenyls are extracted from the fibers by soaking the fibers in toluene overnight under tension. The fibers are allowed to air dry at room temperature for about 1 hour. The resulting fiber size is about 290×480 microns.

The hollow fibers are assembled into cells. The test cell is a pressure vessel with four ports, two tubesheet ports and two shellside ports. Eight fibers are passed into one of the tubesheet ports and out the other allowing for a 14 centimeter length of fibers to be contained within the test device. Epoxy tubesheets are formed in the two tubesheet ports to give a leak-tight bond between the fiber and the two ports.

To test for gas flux, the test cells are pressurized with nitrogen or carbon dioxide at 50 psig by allowing the compressed gas to enter the test cell through one shellside port while leaving other shellside port closed. The exit port is then opened for a few minutes to purge the vessel of air and then closed with pure nitrogen or carbon dioxide left in the vessel. With the exit port closed and the feed port opened, the gas contained within the test device, by means of a pressure driving force, permeates through the walls of the hollow fibers and passes through the lumen of the fibers and out through the tubesheet ports where the flow rate is measured either by means of bubble or mass flow meters. There is negligible back pressure on the gas exiting the tubesheet. From these flow measurements, the gas flux rate can be calculated by use of the follow equation.

$$\text{Gas Flux} = \frac{\text{Measured flow}}{\text{surface area of fiber (centimeter}^2) \times \text{pressure (centimeter Hg)} \times 60 \text{ (seconds/minute)}}$$

The units are standard cubic centimeter/centimeter$^2$ centimeter Hg second.

Measured flow=standard cubic centimeters/minute.
Surface area of fibers 32 3.14× OD (outside diameter, cm) ×length×the number of fibers.
Pressure (centimeter Hg)=psi. ×76 / 14.7.
The fibers exhibit no gas flux under these conditions.
The weight loss of the extracted fibers is determined gravimetrically as described in Example 2 to be about 45 percent. Examination of the extracted fibers by SEM indicates that the fibers possess a porous structure with a thin skin of about 2 to about 4 microns at the outer surface.

Example 4

Non-interconnecting Porous PEEK Hollow Fibers

A mixture of about 50 weight percent PEEK (ICI grade 450) and 50 weight percent diphenylsulfone is heated to about 350 degrees Celsius in a resin kettle with stirring under nitrogen purge to form a uniform solution. The blend is poured into a metal tray, cooled, broken into pieces, and ground into particles. The PEEK/diphenylsulfone particles are then extruded through a KOCH Engineering high intensity static mixer and pelletized.

The PEEK/diphenylsulfone pellets are fed to a ¾ inch Killion single screw extruder equipped with a hollow fiber spinneret and nitrogen core gas. The hollow fibers are extruded using a temperature profile of from about 265 to about 315 degrees Celsius, quenched in room temperature air for less than about 25 seconds, follwwed by quenching for about 1.5 seconds in a water bath at room temperature. The fibers are drawn at a rate of 33 meters/minute and wound onto spools. The diphenylsulfone is extracted from the fibers by soaking the fibers in methylene chloride for 1 hour under tension. The fibers are dried under vacuum at room temperature for about 2 hours. The resulting fiber size is about 217×289 microns.

The hollow fibers are assembled into test cells as described in Example 3. The fibers exhibit no gas flux at a feed pressure of 10 psi. and room temperature. No bubbles are observed when conducting the bubble point test as described in Example 5 at a pressure of 5 psi. Weight loss upon leaching and drying is about 35 percent.

Example 5

Interconnecting Porous PEEK Hollow Fibers

A mixture of about 50 weight percent PEEK (ICI grade 450), 42 weight percent 1,3,5-triphenylbenzene, and 8 weight percent m-terphenyl is heated to about 330 degrees Celsius in a resin kettle with stirring under nitrogen purge to form a uniform solution. The blend is poured into a metal tray, cooled, broken into pieces, and ground into particles.

The PEEK/1,3,5-triphenylbenzene/m-terphenyl mixture is fed to a ¾ inch Killion single screw extruder equipped with a hollow fiber spinneret and nitrogen core gas. The hollow fibers are extruded at about 330 degrees Celsius, quenched in room temperature air for less than about 60 seconds, followed by quenching for about 1.5 seconds in a water bath at room temperature. The fibers are drawn at a rate of about 50 meters/minute and wound onto spools. The triphenylbenzene and m-terphenyl are extracted from the fibers by soaking the fibers in methylene chloride overnight under tension and are dried under vacuum for about 1 hour at room temperature. The resulting fiber size is about 50×120 microns.

The hollow fibers are assembled into cells as described in Example 3.

The gas flux of the fibers is evaluated as described in Example 3. The fibers exhibit a nitrogen flux of about 0.16 to 2.1×10$^{-4}$ cm$^3$ (STP)/(cm$^2$ sec cmHg) at a feed pressure of 50 psi. and room temperature. The fibers are then evaluated for water flux by first wetting the pores with methanol and then applying room temperature water pressurized to 40 psi. to the shellside of the test cell and collecting the water which permeates through to the fiber lumen. The water flux is determined to be 1.0 gal/ft$^2$/day. The gas and water flux measurements indicate the fibers possess an interconnecting porous structure.

A bubble point test conducted with methanol in accordance with ASTM Method E128-61 described in *1986 Annual Book of ASTM Standards*. Vol. 14.02, 1986, reveals no bubbles at test pressures of 80 psi., indicating that the pore size of the fibers is less than about 0.1 microns.

The rejection of various solutes is tested by successively feeding a solution containing a solute to the shellside of the test device at room temperature and a pressure of 50 psi. and analyzing the permeate collected from the fiber lumen to determine the extent of solute rejection. The percent rejection is calculated using the equation $100 \times [1-(C_p/C_f)]$ where $C_p$ is the concentration of the solute in the permeate and $C_f$ is the concentration of the solute in the feed. The different solutes used and their nominal molecular weights in daltons are: Blue Dextran 2,000,000, Cytochrome C 12,400, Vitamin B-12 1335 and Methylene Blue 320. The feed concentrations of the solutes in the solutions is approximately in the range of 0.25 grams/liter. The solute rejections are Blue Dextran 99 percent, Cytochrome C 99 percent, Vitamin B-12 95 percent, and Methylene Blue 0 percent, indicating the fibers have a molecular weight cut-off about 1335 daltons.

The weight loss of the extracted fibers is determined gravimetrically as described in Example 2 to be about 45 to 50 percent.

Example 6

Hollow Fibers Using Core Fluid

A mixture of about 40 weight percent PEEK (ICI grade 450), 52 weight percent 1,3,5-triphenylbenzene, and 8 weight percent m-terphenyl is heated to about 350 degrees Celsius in a resin kettle with stirring under nitrogen purge to form a uniform solution. The blend is poured into a metal tray, cooled, broken into pieces, and ground into particles.

The PEEK/1,3,5-triphenylbenzene/m-terphenyl particles are fed to a ¾ inch Killion single screw extruder equipped with a hollow fiber spinneret using a core liquid of Mobiltherm 600 TM heat transfer oil (TM trademark of Mobil Oil Corporation). The hollow fibers are extruded at about 330 degrees Celsius, quenched in room temperature air for less than about 15 seconds, followed by quenching for about 1.5 second in a water bath at room temperature. The fibers are drawn at a rate of about 40 meters/minute and wound onto spools. The 1,3,5-triphenylbenzene and m-terphenyl are extracted from the fibers by soaking the fibers in methylene chloride overnight under tension. The fibers are allowed to air dry at room temperature for about 20 hours. The resulting fiber size is about 540 to 740 microns in outer diameter with an inner diameter of about 360 to 500 microns.

The hollow fibers are assembled into cells as described in Example 3.

The gas flux of the fibers is evaluated as described in Example 3. The fibers do not exhibit a nitrogen flux at a feed pressure of 50 psi. and room temperature.

SEM indicates that the fibers possess a thin skin of several microns on the inside of the hollow fibers with a porous area on the outside of the fibers.

What is claimed is:

1. A process for preparing microporous poly(etheretherketone)-type fibers, comprising
   A. forming an extrusion mixture of
      (1.) at least one unsulfonated poly(etheretherketone)-type polymer,
      (2.) a solvent comprising at least one organic compound consisting predominantly of carbon and hydrogen and optionally oxygen, nitrogen, sulfur, halogen, and mixtures thereof, wherein the organic compound has a molecular weight of between about 160 and 450, contains at least one six membered aromatic ring structure, possesses a boiling point of between about 240 and 480 degrees Celsius, and is capable of dissolving at least about 10 weight percent of the poly(etheretherketone)-type polymer present at the extrusion temperature,
   B. extruding the fluid to form solid or hollow fibers;
   C. conveying the fibers through at least one quench zone wherein the fibers cool and solidify;

D. conveying the fibers through at least one leach zone wherein a substantial portion of the solvent is removed; and E. drying the fibers;

wherein the fibers so formed possess interconnecting or non-interconnecting pores.

2. The process of claim 1 wherein the pores are non-interconnecting.

3. The process of claim 2 wherein the fibers are hollow.

4. The process of claim 2 wherein the fibers are solid.

5. The process of claim 2 wherein the concentration of poly(etheretherketone)-type polymer in the extrusion mixture is between about 10 to about 90 weight percent.

6. The process of claim 5 wherein the porosity ranges from about 10 to about 90 percent.

7. The process of claim 6 wherein the pore size ranges from about $1 \times 10^{-3}$ to about 3.0 microns.

8. The process of claim 2 wherein the poly(etheretherketone)-type polymer contains predominantly ether, —R—O—R—, and ketone, —R—CO—R—, linkages, wherein R is a substituted or unsubstituted phenylene of the formula:

wherein
X is independently in each occurrence hydrogen, a $C_{1-4}$ alkyl, or a halogen; and
m is an integer between and 4 inclusive.

9. The process of claim 8 wherein the poly(etheretherketone)-type polymer is selected from the group consisting of poly(etherketone) (PEK), poly(aryletherketone) (PAEK), poly(etheretherketone) (PEEK), poly(etherketoneketone) (PEKK), poly(etheretheretherketone) (PEEEK), poly(etheretherketoneketone) (PEEKK), poly(etherketoneetherketoneketone) (PEKEKK), and mixtures thereof.

10. The process of claim 9 wherein the poly(etheretherketone)-type polymer is poly(oxy-p-phenyleneoxy-p-phenylenecarbonyl-p-phenylene) (PEEK) or poly-(oxy-1,4-phenylenecarbonyl-1,4-phenylene) (PEK).

11. The process of claim 2 wherein the solvent is selected from the group consisting of diphenic acid, N,N-diphenylformamide, benzil, anthracene, 1-phenylnaphthalene, 4-bromobiphenyl, 4-bromodiphenyl ether, benzophenone, 1-benzyl-2-pyrrolidinone, o,o'-biphenol, phenanthrene, triphenylmethanol, triphenylmethane, triphenylene, 1,2,3-triphenylbenzene, diphenylsulfone, 2,5-diphenyloxazole, 2-biphenylcarboxylic acid, 4-biphenylcarboxylic acid, m-terphenyl, 4-benzoylbiphenyl, 2-benzoylnaphthalene, 3-phenoxybenzyl alcohol, fluoranthene, 2,5-diphenyl-1,3,4-oxadiazole, 9-fluorenone, 1,2-dibenzoyl benzene, dibenzoylmethane, p-terphenyl, 4-phenylphenol, 4,4'-dibromobiphenyl, diphenyl phthalate, 2,6-diphenylphenol, phenothiazine, 4,4'-dimethoxybenzophenone, 9,10-diphenylanthracene, pentachlorophenol, pyrene, 9,9'-bifluorene, a mixture of terphenyls, a mixture of partially hydrogenated terphenyls, a mixture of terphenyls and quaterphenyls, 1-phenyl-2-pyrrolidinone, 4,4'-isopropyldenediphenol, 4,4'-dihdroxybenzphenone, quaterphenyls, and mixtures thereof.

12. The process of claim 1 wherein the extrusion mixtures contains an additional component consisting of a non-solvent comprising at least one organic compound consisting predominantly of carbon and hydrogen and optionally oxygen, phosphorus, silicon, nitrogen, sulfur, halogen, and mixtures thereof, wherein the organic compound has a molecular weight of between about 120 and 455, possesses a boiling point of between about 240 and 480 degrees Celsius, and dissolves less than about 10 weight percent of the poly(etheretherketone)-type polymer present at the extrusion temperature, wherein the non-solvent is substantially removed in the leach zone along with the solvent.

13. The process of claim 12 wherein the pores are interconnecting.

14. The process of claim 13 wherein the fibers are hollow.

15. The process of claim 13 wherein the fibers are solid.

16. The process of claim 13 wherein the poly(etheretherketone)-type polymer contains predominantly ether, —R—O—R—, and ketone, —R—CO—R—, linkages, wherein R is a substituted or unsubstituted phenylene of the formula:

wherein
X is independently in each occurrence hydrogen, a $C_{1-4}$ alkyl, or a halogen; and
m is an integer between 0 and 4 inclusive.

17. The process of claim 16 wherein the poly(etheretherketone)-type polymer is selected from the group consisting of poly(etherketone) (PEK), poly(aryletherketone) (PAEK), poly(etheretherketone) (PEEK), poly(etherketoneketone) (PEKK), poly(etheretheretherketone) (PEEEK), poly(etheretherketoneketone) (PEEKK), poly(etherketoneetherketoneketone) (PEKEKK), and mixtures thereof.

18. The process of claim 17 wherein the poly(etheretherketone)-type polymer is poly(oxy-p-phenyleneoxy-p-phenylenecarbonyl-p-phenylene) (PEEK) or poly-(oxy-1,4-phenylenecarbonyl-1,4-phenylene) (PEK).

19. The process of claim 12 wherein the non-solvent is selected from the group consisting of 1,3,5-triphenylbenzene, tetraphenylmethane, tetraphenylsilane, diphenylsulfoxide, 1,1-diphenylacetone, 1,3-diphenylacetone, 4-acetylbiphenyl, 4,4'-diphenylbenzophenone, 1-benzoyl-4-piperidone, diphenyl carbonate, bibenzyl, diphenylmethylphosphate, 1-bromonapthalene, 2-phenoxybiphenyl, triphenylphosphate, cyclohexylphenylketone, 1,4-dibenzoylbutane, 2,4,6-trichlorophenol, mineral oil, paraffin oil, petroleum oil, butyl stearate, 9-phenylanthracene, 2-phenylphenol, 1-ethoxynaphthalene, phenyl benzoate, 1-phenyldecane, 1-methoxynaphthalene, 2-methoxynaphthalene, 1,3-diphenoxybenzene, 1,8-dichloroanthraquinone, 9,10-dichloro-anthracene, polyphosphoric acid, 1-chloronaphthalene, diphenyl ether, 1-cyclohexyl-2-pyrrolidinone, hydrogenated terphenyl, dioctyl phthalate, 5-chloro-2-benzoxazolone, dibenzothiophene, diphenyl sulfide, diphenyl chlorophosphate, fluorene, sulfolane, methyl myristate, methyl stearate, hexadecane, dimethyl phthalate, tetraethylene glycol dimethyl ether, diethylene glycol dibutyl ether, docosane, eicosane, dotriacontane, 2,7-dimethoxynaphthalene, 2,6-dimethoxynaphthalene, o-terphenyl, 1,1-diphenylethylene, epsilon-caprolactam, thianthrene, silicone oil, and mixtures thereof.

20. The process of claim 13 wherein the concentration of poly(etheretherketone)-type polymer in the extrusion mixture is between about 20 to about 70 weight percent.

21. The process of claim 20 wherein the fibers have a porosity of between about 20 to about 70 percent.

22. The process of claim 21 wherein the fibers have an average pore size of between about $1 \times 10^{-3}$ and about 3.0 microns.

23. The process of claim 13 wherein the solvent/nonsolvent ratio in the extrusion mixture is between about 0.05 to about 24.

24. The process of claim 14 wherein the fibers have a molecular weight cut-off based on a particle size for ultrafiltration in the range of about 10 to 500 Angstroms and a molecular weight cut-off based on a particle size for microfiltration in the range of about 0.05 to 7.0 microns.

* * * * *

UNITED STATES PATENT AND TRADEMARK OFFICE
CERTIFICATE OF CORRECTION

PATENT NO. : 4,904,426

DATED : February 27, 1990

INVENTOR(S) : R. A. Lundgard et al.

It is certified that error appears in the above-identified patent and that said Letters Patent is hereby corrected as shown below:

Col. 4, line 68, delete "Therminol 126" and insert -- Therminol 75™ --;

Col. 7, line 20, after "90" insert -- weight --;

Col. 11, in the Table, under the heading Solub., Reference No. 226, delete "s 49.4%" and insert -- s 49.9% --;

Col. 13, in the Table, under the heading Compound, under the third reference to Number 264, delete "o,o'Biphenol" and insert -- o,o'-Biphenol --;

Col. 13, in the Table, under the heading Melting Point, Reference No. 266, delete "50" and insert -- -50 --;

UNITED STATES PATENT AND TRADEMARK OFFICE
CERTIFICATE OF CORRECTION

PATENT NO. : 4,904,426
DATED : February 27, 1990
INVENTOR(S) : R. A. Lundgard et al.

It is certified that error appears in the above-identified patent and that said Letters Patent is hereby corrected as shown below:

Col. 13, in the Table, under the heading Reference No., delete "380" and insert -- 280 --;

Col. 16, line 38, delete "32" and insert -- = --.

Signed and Sealed this

Twenty-fifth Day of August, 1992

Attest:

DOUGLAS B. COMER

*Attesting Officer*     *Acting Commissioner of Patents and Trademarks*